United States Patent
Li et al.

(10) Patent No.: US 12,039,427 B2
(45) Date of Patent: Jul. 16, 2024

(54) CURSOR-BASED ADAPTIVE QUANTIZATION FOR DEEP NEURAL NETWORKS

(71) Applicants: Baidu USA, LLC, Sunnyvale, CA (US); Baidu.com Times Technology (Beijing) Co., Ltd., Beijing (CN)

(72) Inventors: Baopu Li, Santa Clara, CA (US); Yanwen Fan, Beijing (CN); Zhiyu Cheng, Sunnyvale, CA (US); Yingze Bao, Mountain View, CA (US)

(73) Assignees: Baidu USA LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 981 days.

(21) Appl. No.: 16/966,834

(22) PCT Filed: Sep. 24, 2019

(86) PCT No.: PCT/CN2019/107509
§ 371 (c)(1),
(2) Date: Jul. 31, 2020

(87) PCT Pub. No.: WO2021/056180
PCT Pub. Date: Apr. 1, 2021

(65) Prior Publication Data
US 2021/0232890 A1    Jul. 29, 2021

(51) Int. Cl.
*G06N 3/04* (2023.01)
*G06N 3/08* (2023.01)

(52) U.S. Cl.
CPC ............ *G06N 3/04* (2013.01); *G06N 3/08* (2013.01)

(58) Field of Classification Search
CPC ............ G06N 3/04; G06N 3/08; G06N 3/063
See application file for complete search history.

(56) References Cited

U.S. PATENT DOCUMENTS

2017/0270408 A1* 9/2017 Shi ..................... G06N 3/08
2018/0137406 A1  5/2018 Howard et al.
(Continued)

FOREIGN PATENT DOCUMENTS

CN    106796668 A    5/2017
CN    109002889 A    12/2018
(Continued)

OTHER PUBLICATIONS

Li, "Cursor-based Adaptive Quantization for Deep Convolutional Neural Network", IEEE, 2021. (Inventors equivalent NPL. Date precludes usage). (Year: 2021).*

(Continued)

*Primary Examiner* — Dave Misir
(74) *Attorney, Agent, or Firm* — NORTH WEBER & BAUGH LLP

(57) ABSTRACT

Deep neural networks (DNN) model quantization may be used to reduce storage and computation burdens by decreasing the bit width. Presented herein are novel cursor-based adaptive quantization embodiments. In embodiments, a multiple bits quantization mechanism is formulated as a differentiable architecture search (DAS) process with a continuous cursor that represents a possible quantization bit. In embodiments, the cursor-based DAS adaptively searches for a quantization bit for each layer. The DAS process may be accelerated via an alternative approximate optimization process, which is designed for mixed quantization scheme of a DNN model. In embodiments, a new loss function is used in the search process to simultaneously optimize accuracy and parameter size of the model. In a quantization step, the closest two integers to the cursor may be adopted as the bits to quantize the DNN together to reduce the quantization noise and avoid the local convergence problem.

20 Claims, 6 Drawing Sheets

(56) References Cited

U.S. PATENT DOCUMENTS

| | | | |
|---|---|---|---|
| 2018/0276534 A1 | 9/2018 | Henry | |
| 2019/0050710 A1* | 2/2019 | Wang | G06N 3/063 |
| 2019/0147318 A1 | 5/2019 | Howard et al. | |
| 2019/0286980 A1* | 9/2019 | Backhus | G06N 3/045 |
| 2020/0134461 A1* | 4/2020 | Chai | G06N 3/084 |
| 2021/0286688 A1* | 9/2021 | Liu | G06N 3/08 |

FOREIGN PATENT DOCUMENTS

| | | |
|---|---|---|
| CN | 109190754 A | 1/2019 |
| CN | 109685198 A | 4/2019 |
| CN | 110222821 A | 9/2019 |
| WO | 20170176384 A2 | 10/2017 |

OTHER PUBLICATIONS

Gao et al., "GraphNAS:graph neural architecture search with reinforcement learning," arXiv preprint arXiv: 1904.09981, 2019. (7 pgs).
Guo et al., "IRLAS: Inverse reinforcement learning for architecture search," arXiv preprint arXiv: 1812.05285, 2019. (10pgs).
Liang et al., "Evolutionary Architecture Search for Deep Multitask Networks," arXiv preprint arXiv: 1803.03745, 2018. (8pgs).
Lin et al., "Fixed point quantization of deep convolutional networks," arXiv preprint, arXiv:1511.06393, 2016. (10 pgs).
Liu et al., "DARTS: Differentiable architecture search," arXiv preprint arXiv:1806.09055, 2019. (13 pgs).
Louizos et al., "Relaxed quantization for discretized neural networks," arXiv preprint arXiv:1810.01875, 2018. (14pgs).
Peng et al., "Collaborative channel pruning for deep networks," In Proc. of the 36th Intr. Conf. on Machine Learning, 2019. (10pgs).
Pham et al., "Efficient neural architecture search via parameter sharing," arXiv preprint arXiv:1802.03268, 2018. (11pgs).
Polino et al., "Model compression via distillation and quantization," arXiv preprint, arXiv:1802.05668, 2018. (21 pgs).
Sandler et al., "MobileNetV2: Inverted Residuals and Linear Bottlenecks," arXiv preprint, arXiv:1801.04381, 2019. (14pgs).
Rastegari et al.,"XNOR-Net: ImageNet classification using binary convolutional neural networks," arXiv preprint arXiv: 1603.05279, 2016. (17pgs).
Tai et al., "Convolutional neural networks with low-rank regularization," arXiv preprint, arXiv: 1511.06067, 2016. (11 pgs).
Wang et al., "HAQ: Hardware-Aware automated quantization with mixed precision," arXiv preprint arXiv:1811.08886, 2019. (10 pgs).
Wang et al., "Wide Compression: Tensor Ring Nets, " arXiv preprint, arXiv:1802.09052, 2018. (12pgs).
Wu et al., "Mixed precision quantization of convnets via differentiable neural architecture search," arXiv preprint arXiv:1812.00090, 2018. (11pgs).
Wu et al., "Quantized Convolutional Neural Networks for Mobile Devices," arXiv preprint, arXiv:1512.06473, 2016. (11pgs).
Zagoruyko et al., "Paying more attention to attention: Improving the performance of convolutional neural networks via attention," arXiv preprint arXiv:1612.03928, 2017. (13pgs).
Zhang et al., "LQ-Nets: Learned Quantization for HighlyAccurate and Compact Deep Neural Networks," arXiv preprint arXiv: 1807.10029, 2018. (21pgs).
Zhou et al., "Dorefa-Net:Training low bitwidth convolutional neural networks with low bitwidth gradients," arXiv preprint arXiv:1606.06160, 2018. (13 pgs).
Zhou et al., "Adaptive Quantization for deep neural network," arXiv preprint arXiv:1712.01048, 2017. (14 pgs).
International Search Report dated Jun. 17, 2020, in International Patent Application No. PCT/CN2019/107509, filed Sep. 24, 2019. (5pgs).
Written Opinion of the International Searching Authority dated Jun. 17, 2020, in International Patent Application No. PCT/CN2019/107509, filed Sep. 24, 2019 (4 pgs).
Zhu et al., "Trained Ternary Quantization," arXiv preprint arXiv:1612.01064, 2017. (10pgs).
Zhuang et al., "Discrimination-aware channel pruning for deep neural networks," arXiv preprint arXiv: 1810.11809, 2019. (18pgs).
Zoph et al., "Neural architecture search with reinforcement learning," arXiv preprint arXiv:1611.01578, 2017. (16 pgs).
Anwar et al., "Structured Pruning of Deep Convolutional Neural Networks," arXiv preprint arXiv:1512.08571, 2015. (11 pgs).
Cai et al., "Path-Level Network Transformation for Efficient Architecture Search," arXiv preprint arXiv: 1806.02639, 2018. (12 pgs).
Choi et al., "PACT: Parameterized clipping activation for quantized neural networks," arXiv preprint arXiv:1805.06085, 2018. (15pgs).
Courbariaux et al., "Binarynet: training deep neural networks with weights and activations constrained to +1 or −1," arXiv preprint arXiv:1602.02830, 2016. (11pgs).
Elthakeb et al.,"ReLeQ:A Reinforcement Learning Approach for Deep Quantization of Neural Networks," arXiv preprint arXiv:1811.01704, 2020. (13pgs).
Gong et al., "Compressing deep convolutional networks using vector quantization," arXiv preprint arXiv:1412.6115, 2014. (10pgs).
Han et al., "Deep compression: compressing deep neural networks with pruning, trained quantization and Huffman coding," arXiv preprint arXiv: 1510.00149, 2016. (14pgs).
Hayashi et al., "EINCONV:Exploring unexplored tensor decompositions for convolutional neural networks," arXiv preprint arXiv:1908.04471, 2019. (12pgs).
He et al., "Deep Residual Learning for Image Recognition," arXiv preprint arXiv:1512.03385, 2015. (12pgs).
Hinton et al., "Distilling the knowledge in a neural network," arXiv preprint arXiv:1503.02531, 2015. (9pgs).
Chinese Office Action dated Mar. 25, 2023, in Chinese Application No. 20198006253 (11pgs).
Y. Guo, "A survey on methods and theories of quantized neural networks," arXiv preprint arXiv:1808.04752, 2018. (17 pgs).
E. Park et al., "Precision highway for ultra low-precision quantization," arXiv preprint arXiv:1812.09818, 2018. (10pgs).
E. Park et al., "Value-aware quantization for training and inference of neural networks," arXiv preprint arXiv:1804.07802, 2018. (16pgs).
X. Wei et al., "FPGA-based hybrid-type implementation of quantized neural networks for remote sensing applications," Sensors, 19(4), 2019. (21pgs).

* cited by examiner

200

┌─────────────────────────────────────────────────────────────┐
│ For the layer, identify the two nearest integer values that bound the continuous │ ─ 205
│ cursor value (i.e., an upper bound integer value and a lower bound integer │
│ value) │
└─────────────────────────────────────────────────────────────┘
                                    ↓
┌─────────────────────────────────────────────────────────────┐
│ Use the upper and lower bound integer values for the layer to quantize the NN │ ─ 210
│ parameter values for that layer │
└─────────────────────────────────────────────────────────────┘
                                    ↓
┌─────────────────────────────────────────────────────────────┐
│ Given the quantized parameter values, compute compression component of the │ ─ 215
│ loss function │
└─────────────────────────────────────────────────────────────┘

FIG. 2

CURSOR-BASED ADAPTIVE QUANTIZATION FOR DEEP NEURAL NETWORKS

CROSS-REFERENCE TO RELATED APPLICATIONS

This patent application is filed pursuant to 35 USC § 371 as a US National Phase Application of International Patent Application No. PCT/CN2019/107509, filed on 24 Sep. 2019, entitled "CURSOR-BASED ADAPTIVE QUANTIZATION FOR DEEP NEURAL NETWORKS," listing Baopu Li, Yanwen Fan, Zhiyu Cheng, and Yingze Bao as inventors, which patent document is incorporated by reference herein in its entirety and for all purposes.

TECHNICAL FIELD

The present disclosure relates generally to systems and methods for computer learning that can provide improved computer performance, features, and uses. More particularly, the present disclosure relates to systems and methods for effectively reducing deep neutral networks memory sizes.

BACKGROUND

Deep learning (DL) has achieved great successes in varied fields such as gaming, natural language processing, speech recognition, computer vision, and so on. However, its huge computational burden and large memory consumption still limit many potential applications, especially for mobile devices and embedded systems.

A number of efforts have been devoted to compress a DL model's size and accelerate its training and test speed. These efforts can be roughly categorized into four major classes: network pruning, low rank approximation, knowledge distillation, and network quantization. Among them, network quantization methods, jointly optimizing the whole network weights, activations or gradients with low bit (such as 8 bits or even 1 bit), show great potential in compressing model size and accelerating inference time. In addition, quantization-based approaches are preferable for mobile devices and embedded systems since these devices are gradually equipped by specifically designed low bit computing hardware. Furthermore, using quantized representations, some operations of the neural network can be implemented by bitwise operations, leading to much less energy consumption.

Although existing quantization-based approaches, which mainly use a fixed-bit scheme to represent the whole DNN model, yield some encouraging compression ratios while keeping the model's performance, simply using only a fixed bit for quantization may not be the optimal choice for the tradeoff between a model size and its performance.

Accordingly, what is needed are systems and methods for improved quantization for neural network model compression.

SUMMARY

In a first aspect, a computer-implement method for reducing memory size of a neural network is provided. The neural network includes a plurality of layers, and the method includes: responsive to a stop condition not being reached, performing steps including: inputting a training data batch, which was obtained from a training data set including input data and corresponding ground truth data, into the neural network to obtain a training data output; determining a training data loss for the neural network given the training data output from the neural network and a loss function that includes a loss component related to prediction accuracy of the neural network and a compression component related to memory size of parameter values of the neural network after quantization; updating at least some of the parameter values of the neural network using the training data loss; inputting a validation data batch, which was obtained from a validation data set including input data and corresponding ground truth data, into the neural network to obtain a validation data output; determining a validation data loss for the neural network given the validation data output from the neural network and the loss function; updating cursor values for at least some of the layers of the neural network using the validation data loss, in which a cursor value for a layer in the neural network is related to memory size for representing parameter values for the layer; and for each layer of at least some of the layers, quantizing parameter values of the layer of the neural network using two integers that bound the cursor value for that layer, which quantized parameter values are used in determining the compression component of the loss function; and responsive to a stop condition being reached: outputting final cursor values for the at least some of the layers of the neural network, in which the final cursor value for a layer of the neural network is the bit size for representing parameter values for that layer of the neural network; and outputting a set of parameter values for the neural network.

In a second aspect, a system is provided. The system includes one or more processors; and a non-transitory computer-readable medium or media storing one or more sequences of instructions which, when executed by at least one of the one or more processors, causes steps to be performed including: responsive to a stop condition not being reached, performing steps: inputting a training data batch, which was obtained from a training data set including input data and corresponding ground truth data, into the neural network to obtain a training data output; determining a training data loss for the neural network given the training data output from the neural network and a loss function that includes a loss component related to prediction accuracy of the neural network and a compression component related to memory size of parameter values of the neural network after quantization; updating at least some of the parameter values of the neural network using the training data loss; inputting a validation data batch, which was obtained from a validation data set including input data and corresponding ground truth data, into the neural network to obtain a validation data output; determining a validation data loss for the neural network given the validation data output from the neural network and the loss function; updating cursor values for at least some of the layers of the neural network using the validation data loss, in which a cursor value for a layer in the neural network is related to memory size for representing parameter values for the layer; and for each layer of at least some of the layers, quantizing parameter values of the layer of the neural network using two integers that bound the cursor value for that layer, which quantized parameter values are used in determining the compression component of the loss function; and responsive to a stop condition being reached: outputting final cursor values for the at least some of the layers of the neural network, in which the final cursor value for a layer of the neural network is the bit size for representing parameter values for that layer of the neural network; and outputting a set of parameter values for the neural network.

In a third aspect, a non-transitory computer-readable medium or media storing one or more sequences of instructions is provided. The instructions, when executed by one or more processors, causes steps to be performed including: responsive to a stop condition not being reached, performing steps including: inputting a training data batch, which was obtained from a training data set including input data and corresponding ground truth data, into the neural network to obtain a training data output; determining a training data loss for the neural network given the training data output from the neural network and a loss function that includes a loss component related to prediction accuracy of the neural network and a compression component related to memory size of parameter values of the neural network after quantization; updating at least some of the parameter values of the neural network using the training data loss; inputting a validation data batch, which was obtained from a validation data set including input data and corresponding ground truth data, into the neural network to obtain a validation data output; determining a validation data loss for the neural network given the validation data output from the neural network and the loss function; updating cursor values for at least some of the layers of the neural network using the validation data loss, in which a cursor value for a layer in the neural network is related to memory size for representing parameter values for the layer; and for each layer of at least some of the layers, quantizing parameter values of the layer of the neural network using two integers that bound the cursor value for that layer, which quantized parameter values are used in determining the compression component of the loss function; and responsive to a stop condition being reached: outputting final cursor values for the at least some of the layers of the neural network, in which the final cursor value for a layer of the neural network is the bit size for representing parameter values for that layer of the neural network; and outputting a set of parameter values for the neural network.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

Figure ("FIG.") 1 depicts a method for cursor-based adaptive quantization for a neural network, according to embodiments of the present disclosure.

FIG. 2 depicts a method for quantizing, according to embodiments of the present disclosure.

DETAILED DESCRIPTION OF EMBODIMENTS

Figure 1:
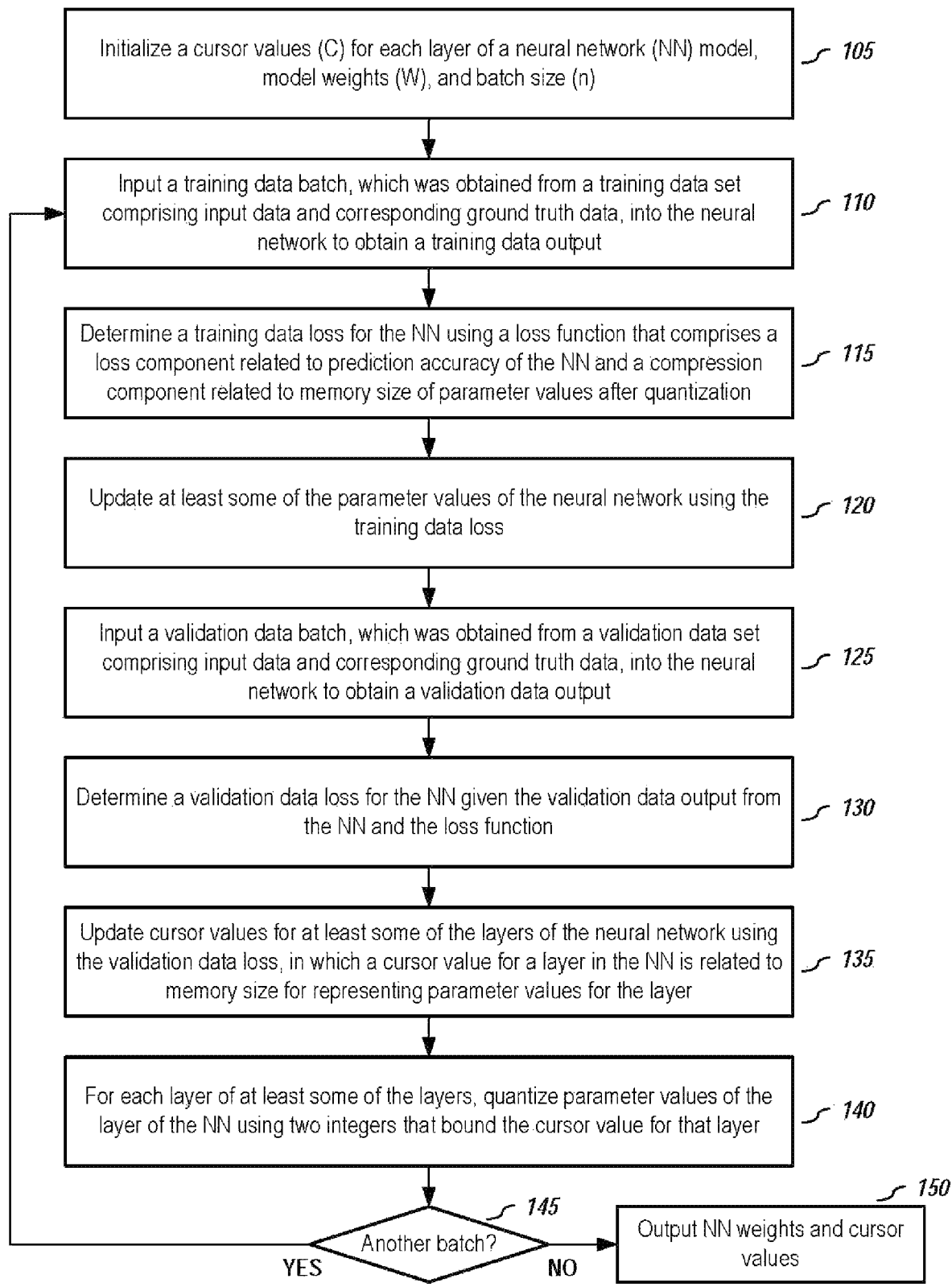

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium or media.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. A "layer" may comprise one or more operations.

Any headings used herein are for organizational purposes only and shall not be used to limit the scope of the description or the claims. Each reference/document mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

As noted above, simply using only a single fixed bit for quantization may not be the optimal choice for the tradeoff between a model size and its performance. For example, to run a model on chips with strict memory limitations, 1-bit or 2-bit quantization suffers from severe accuracy loss while 16-bit or 8-bit quantization tend not to significantly reduce a model's memory size.

To address the above problem, presented herein are embodiments of a cursor-based adaptive quantization methodology to derive multiple bits in different layers for DNN model compression; that is, a search is performed for the best configuration of different bit quantization for different layers in a neural network model. Distinctive from most other algorithms, embodiments herein are motivated by recent neural architecture search (NAS) that aims to find better performance neural architecture with less calculations or less size automatically. One key in embodiments of the methodology herein is using a continuous cursor that represents the bit quantization scheme for each layer. For different layers, many cursors will be adaptively searched at the same time during the NAS process. Since the cursor itself is continuous and the whole search procedure can be considered as a differentiable architecture search (DAS) process, the procedure can be effectively solved based on an alternative optimization strategy. In one or more embodiments, a novel cost function that considers the model compression and prediction accuracy may be used in the DAS process. After the cursor is searched, a quantization process may be applied to compress the model size. To reduce the possible quantization noise and local convergence problem, in one or more embodiments, the methodology makes use of the closest two integer bits to the cursor to quantize the weights for each layer in a DNN model. Embodiments of were validated with image classification tasks on the CIFAR10 and CIFAR100 datasets. Comprehensive experiments on some backbone DNN models show that the embodiments of the cursor-based quantization methodology achieve remarkably better performance of compression ratio with ignorable accuracy drop or even better accuracy.

In summary, some of the contributions of this work include:

1. Casting the adaptive quantization of neural network as a problem of neural architecture search. Embodiments of a continuous cursor scheme are presented herein to represent the possible quantization bit, leading to a more efficient search space.

2. Embodiments of a novel regularization function are presented herein to optimize model compression in the search process. Thus, the search for the cursor position and weights may be efficiently solved in an alternative optimization manner.

3. In one or more embodiments, for a layer, two nearest neighbor integers to the cursor are adopted with a carefully designed strategy to implement the quantization of the network to reduce the quantization noise and avoid possible local convergence.

4. Embodiments of the adaptive quantization methodology presented herein were evaluated on some benchmark datasets and achieved new state-of-the-art performance for multiple bit quantization of a neural network.

B. Related Work

Any headings used herein are for organizational purposes only and shall not be used to limit the scope of the description or the claims. Each reference/document mentioned in this patent Quantization plays an important part in DNN model compression. Recently, a number of quantization approaches have been proposed, enabling the quantized compressed model to compete relatively well with their full precision counterparts. Some applied vector quantization to compress neural networks by clustering the weights into groups and utilizing the centers of these groups to represent the weights in inference process. Later, others also applied clustering a method for their codebook representation, and then they retrained the network to get better quantized centroids. Yet others jointly trained a DNN and its associated quantizes to reduce the noticeable predication accuracy gap between the quantized model and its full precision one. A direct differentiable quantization method has been introduced with some promising test accuracy. A new activation quantization method that takes an activation clipping parameter has also been proposed to ensure the suitable quantization scale.

Some efforts have also been taken on quantization of the neural network with multiple bits for different layers. Some have applied signal-to-quantization-noise ratio (SQNR) on layer weight to evaluate the effects of quantization error. Based on SQNR, different bits were used for quantization of each layer, yielding about 20% model size reduction without accuracy loss in their tests. Some first presented an automated mixed precision quantization scheme by applying reinforcement learning (RL) technique to obtain better latency for different hardware, such as edge and cloud; they claimed that their actor-critic model produced efficient actions that result in better latency and less energy consumption with negligible loss of accuracy. Yet others theoretically studied the relations between quantization choice of different layer and the whole DNN performance. A model that describes the effects of parameter quantization error on the whole prediction accuracy was also designed.

In the past few years, a new trend has been witnessed for network design, i.e., neural architecture search (NAS). RL-based approaches are first utilized to generate network with high accuracy, and they also build a strong basis for following works. Then, an evolution-based approach is further applied to obtain the possible optimal solution in the large search space. Both of these two category approaches tend to yield large amount of computational burden because NAS is treated as a black-box optimization problem in a discrete domain, yielding a large number of architecture evaluations, and thus run very slow even on the most advanced GPU (graphic processor unit) machine. To alleviate this problem, some proposed a differentiable approach to accelerate the search of a good neural network by relaxation of the possible operation on the cell level structure, such as Differentiable Architecture Search (DARTs). Others recently proposed a new approach to find the mixed bits for different layers by applying a differentiable NAS (DNAS) method based on a model of super net, which is a kind of directed acyclic graph. They considered the quantization as a problem of sampling on a stochastic super net. And a Gumbel softmax function is applied to relax the sampling process differentiable.

In one or more embodiments, the multiple bits quantization for DNN may be cast as a cursor-based adaptive architecture search problem, which is different from the traditional direct quantization works and the learning-based mixed bits quantization approaches mentioned above. Moreover, embodiments discussed herein are also distinctive from DARTs and DNAS in the methodology itself. The designed cursor-based search embodiments herein may be considered as motivated by NAS, but they do not need extra relaxation as in DARTs and DNAS, among other differences. More details about the distinctions from DARTs and DNAS are provided herein.

C. Cursor-Based Adaptive Quantization Embodiments

In this section, some basic concepts in NAS are briefly presented, followed by the introduction of search space for quantization problem if one reflects on quantization with different bits from the angle of NAS. Differentiable cursor search method embodiments for adaptive quantization are presented afterwards. Finally, embodiments of quantized network training with two closest integers are presented.

1. Neural Architecture Search Embodiments

It is well known that a DNN model typically needs significant time to design its structure and finetune all the related key parameters, such as learning rate, momentum, weigh decay, and so on. As such, there is a strong need for neural network architecture engineering. Neural architecture search (NAS) recently emerged as a popular methodology to overcome the above problem. It automatically designs the optimal architecture of a neural network by considering all possible factors, such as number of layers, width of each layer, different operators in each layer, and so on. Two key concepts are directly related to a NAS process, i.e., search space and search strategy. All the possible combinations of the major factors that influence the network structure constitute the search space, which may affect the possible performance limitation of the DNN. Typically, the search space of a DNN is very large, leading to a huge computational task even for a typical network, such as Resnet20. As such, the previous NAS works instead design normal and reduction cell first, where the NAS is applied for the different possible operation types to find the best one. And then, this kind of motif is repeated to build the final network structure. Another definition is about search strategy, that is, how to transverse in such a large search space. With each searched network structure, the performance of it is evaluated. A typical search method is random search; however, its efficiency is not ideal.

2. Search Space for Quantization Problem

Quantization has also been a very hot research topic in the past few years. Rounding function, vector quantization, or stochastic function are typically applied to implement quantization to compact the model size while maintaining equivalent performance or acceptable loss. Some other approaches also use stochastic or probabilistic methods to quantize the neural network. Most previous methods simply apply one kind of bit quantization to the whole network due to the simplicity of implementation. A few recent works begin to utilize different bit quantization schemes to further improve the compression ratio and prediction accuracy.

If quantization choice is considered as a part of the neural architecture, its corresponding search space can be estimated. Take ResNet20 as an example; if one decides to quantize the neural network with the possible bit width of 1, 2, 4, 8, 16, 32, then all the possible quantization choices for ResNet20 would be $6^{20}$. In the context of NAS, this is a very large number for the search space. Hence, evaluation of so many designs one by one seems infeasible. How to devise an efficient search method remains very challenging in fact.

3. Differentiable Cursor Search for Adaptive Quantization Embodiments

The discrete search space of the above quantization scheme is very large. If the possible bit for each layer is considered as a continuous cursor in the range of [0, 32], the cursors then become significant parts of the architecture for a neural network model, and the search of cursors is adaptive. If a DNN is assumed to have N layers, each layer may have a different value of cursor, $c1, c2, \ldots cN$, together with their weights of WC, one of the goals evolves to how to find a good combination of $c1, c2, \ldots cN$ in terms of prediction accuracy and compression rate. As such, for the whole neural network, it may be described as an optimization problem that minimizes the loss on the validation data after training through the minimization of the loss on the training data as follows:

$$\text{Min } E(x',y')_{\sim D_v}(\text{Loss}(C, W_c))$$

$$s.t. W^*_C = \text{argmin}_w E(x,y)_{\sim D_T}(\text{Loss}(C, W_c)) \quad (1)$$

where C represents the cursor vector, $W^*_C$ is the best weights of C and obtains the best training accuracy, Loss $(C, W_C)$ is the loss function based on the cursors and the weights with the condition of C, $D_T$ and $D_v$ represent the training and validation dataset respectively, (x, y) and (x',y') means data from the training and validation dataset. To consider both the prediction accuracy and model size, in one or more embodiments, the loss function may be designed as a combination of cross entropy and parameter compression.

$$\text{Loss}(C, W_C) = \text{CrossEntropy}(C, W_c) + \lambda \text{Loss}_Q \quad (2)$$

where CrossEntropy$(C,W_c)$ is the cross-entropy function widely used in the field of machine learning, encoding the prediction accuracy of the model. In one or more embodiments, a regularization item is added to the loss function because the regularization can help reduce overfitting. In addition, it may also speed up the convergence process. Concerning the loss related to LossQ, a focus is on the compression of the weight size after quantization and before quantization. So, in one or more embodiments, it is conceived in the form of Eq. (3), and $\lambda$ is a regularization coefficient that controls the tradeoff of accuracy and compression.

The above process is a bi-level optimization problem, which may involve deducing higher order derivatives and may be hard to obtain an exact solution. An approximated iterative solution may be applied instead, so embodiments alternatively take the optimization strategy in weight and cursor space to update C based on the validation losses from DV and update W based on the training losses from DT. By solving this bi-level optimization problem using alternative approximation approach, the cursors may be efficiently searched by a gradient-based optimization approach such as Adam. The experimental results herein also show that the alternative optimization method yields a good solution with high compression ratio and accuracy. Compared to the original discrete search space, this search method is more efficient because of the design of the continuous cursor and the direct gradient-based optimization approach. An embodiment of the whole differentiable cursor search for adaptive quantization based on the alternative optimization of W and C is illustrated in the following pipeline:

Methodology 1: Differentiable Cursor Search for Adaptive Quantization
Input: The training set $D_T$ and validation set $D_V$
Initialized C, W and the batch size n
while not reaching the target epochs or not converge do
   Sample data from training data $D_T$
   Calculate the loss $L_T$ on training data with Eq. (2)
   Updated W by gradient descent $W = W - \nabla W * L_T$
   Sample data from validation data $D_V$
   Calculate the loss Lv on validation data with Eq. (2)
   Update the cursor C by gradient descent:
     $C = C - \nabla C * L_V$
   Quantize the network using two integers that are
   nearest to the searched cursor
end while It should be emphasized that embodiments of our proposed cursor-based differentiable search are different from Differentiable Architecture Search (DARTs) in at least the following three aspects. First, DARTs method considers the possible operation in each layer as a mixture of primitive operations. In one or more embodiments, we directly make use of a cursor to represent the quantization bit for each layer, no mixture operation exists in the whole search algorithm. Second, in DARTs, each primitive operation is assigned with a probability through a softmax function. In one or more embodiments, cursor-based search is optimized directly without probability. Third, DARTs approach concentrates on the cell structure, but in one or more embodiments, the DAS is applied directly on the whole network. Compared to differentiable neural architecture search (DNAS), embodiments herein are also distinctive. For DNAS, the DNAS authors build a stochastic super net first to describe all the possible quantization choices, then a sampling step with a Gumbel softmax function that enables the discrete distribution to be continuous and differentiable is applied in each layer of the super net. In one or more embodiments, the cursor-based differentiable search embodiments have no super net or sampling process in the pipeline. In short, the proposed method embodiments require no relaxation any more as in both DARTs and DNAS approach.

4. Quantized Network Training Embodiments

Aiming for DNN quantization, the cursor that represents the bit should be applied to quantize the weight layers. Unfortunately, in one or more embodiments, the cursor obtained during the search is a fractional number, which cannot be directly used for quantization. In embodiments, the cursor may be rounded to its neighbor integers at a distance. However, this approach may cause quantization error if one chooses the rather distant bits. Another embodiment involves directly rounding the cursor to its nearest integer. However, if one directly rounds the cursor to its nearest integer, it may not efficiently represent the cursor's variation. For example, if cursor1 and cursor2 for different epochs in the same layer are 2.6 and 2.8 respectively, they will be rounded to the same integer 3, yielding no change in the weight size for this layer when implementing quantization. In addition, in the whole search process, such an integer choice may result in local convergence because the iteration process of one integer quantization may get stuck in a local minimum region for the cursor search. To alleviate the above two problems, in yet another embodiment, embodiments make use of the nearest lower and upper integer bound at the same time in the search training process. Compared to directly using the nearest one neighbor to quantize, the lower and upper integer bounds may approximate the cursor real position through a weighted summary of these two bounds, leading to a better representation of the continuous cursor. Moreover, they may produce more variations in the loss function that describes the compression effects, yielding effective gradient changes to update the cursors more efficiently. Subsequent experiments also demonstrate that this design can obtain better quantization performance compared to simply applying rounding function on the searched cursor. As such, the loss function in the cursor-based differentiable search may be designed as follows:

$$\text{Loss}_Q = \left(\frac{\text{parameter size after quantization}}{\text{parameter size before quantization}}\right)^\gamma \quad (3)$$

where $\gamma$ is a coefficient that determines the importance of the whole regularizer.

When implementing the quantization for each layer, in one or more embodiments, the following quantization may be used for each layer based on the obtained two integers:

$$w_k = 2Q_k\left(\frac{\tanh(w)}{2\max(|\tanh(w)|)} + 0.5\right) - 1 \quad (4)$$

where w represents the full precision weight of a model and $Q_k(*)$ is the k-bit quantization function that transforms a continuous value $x \in [0, 1]$ to a k-bit output $y \in [0, 1]$ as follows:

$$y = \frac{1}{2^k - 1}\text{round}((2^k - 1)x)$$

In other words, in the process of quantization, after searching the possible quantization bit of c in each layer, its corresponding two nearest neighbor integers $A_1$ and $A_2$ will be applied to Eq. (4) to quantize the network to obtain the size change in Eq. (3).

In the neural network forward process, based on the cursor's lower and upper bound integer $A_1$ and $A_2$, two coefficients $D_1$ and $D_2$ may be defined as below:

$$D_1 = 1 - (c_i - A_1)$$
$$D_2 = 1 - (A_2 - c_i) \quad (5)$$

where $c_i$ represents the cursor searched by an embodiment of the adaptive methodology described herein in the ith layer of the DNN. Then, the output in the forward process may be described with the following equation:

$$f = D_1 * (\text{Conv}(X, W_1) + D_2 * \text{Conv}(X * W_2)) \quad (6)$$

where $W_1$ and $W_2$ are the weights after quantization using $A_1$ and $A_2$, Cony is the convolution operation, and X is the input data.

While for the computation of size loss in Eq. (3), in one or more embodiments, the layer memory size may be determined as below:

$$\text{layer\_size} = \text{layer\_base\_size} * (D_1 * A_1 + D_2 * A_2) \quad (7)$$

where the layer_base_size is defined as the size of a layer when it is represented by 1 bit for parameter size calculation, and the total loss may be obtained by as a sum of the loss in each layer. In the backward process, the gradient may be applied on its full precision counterpart. After the approximate alternative optimization approach converges or reaches the target epoch number, the final quantization bit in each layer may be obtained by applying rounding operation on each cursor for inference. It should be noted that there may be some quantization errors in the whole procedure, this is also why one may, in one or more embodiments, finetune the weights of the quantized DNN after the search process.

FIG. 1 depicts a method for cursor-based adaptive quantization for a neural network, according to embodiments of the present disclosure. The method for reducing memory size of a neural network, which comprises a plurality of layers, may commence by initializing (105) a cursor value or values for at least some of the layer of the neural network model, the parameter values of the neural network, and a batch size. In one or more embodiments, the parameter values may be randomized, and the cursor value may be set at a mid-range value (e.g., in a 1-bit to 8-bit range, the cursor value may be initialized as 4-bits).

Responsive to a stop condition not being reached, a set of steps may be iterated. In one or more embodiments, the stop condition may be a number of iterations, a number of epochs, convergence (e.g., difference in loss/error between successive iterations is below a threshold), divergence/not converging (e.g., successive iterations are not improving or are worsening), a set amount of time, or other stop conditions commonly used in machine learning applications or general programming. In one or more embodiments, the iteration may commence by inputting (110) a training data batch into the neural network to obtain a training data output. In one or more embodiments, the training data batch may be randomly sampled from a training data set, which includes input data and corresponding ground truth data. Given the output of the neural network from the training data batch, a training data loss for the neural network may be determined (115) given the training data output and a loss function that comprises a loss component related to prediction accuracy of the neural network and a compression component related to memory size of parameter values of the neural network after quantization. In one or more embodiments, the loss function may be a function such as Eq. (2). Given the loss, at least some of the parameter values of the neural network may be updated (120) using the training data loss. For example, in embodiments, parameter values may be updated using gradient descent.

As shown in FIG. 1, the next step comprises inputting (125) a validation data batch into the neural network, which may be the updated neural network, to obtain a validation data output. Like the training data batch, the validation data batch may be randomly sampled from a validation data set, which includes input data and corresponding ground truth data. In one or more embodiments, a validation data loss for the neural network may be determined (130) given the validation data output from the neural network and the loss function. Given the output of the neural network from the validation data batch, the cursor values for at least some of the layers of the neural network are updated (135) using the validation data loss. A cursor value for a layer is related to memory size for representing parameter values for the layer; and in embodiments, it may be a continuous (i.e., non-integer value) at this stage. Since, in one or more embodiments, the cursor value is a continuous value in embodiments, for each layer of at least some of the layers, quantizing (140) parameter values of the layer of the neural network may involve using two integers that bound the cursor value for that layer. As described above, the closest two integers on either side of the continuous cursor value may be used. For example, given a cursor value for a layer of 3.81, the upper and lower integer cursor values are 4 and 3, respectively. It should be noted that, having quantized at least some of the parameter values, these values may be used in determining the compression component (e.g., $Loss_Q$ or $\lambda Loss_Q$) of the loss function of Eq. (2). FIG. 2 depicts a method related to determining a compression element for the loss function, according to embodiments of the present disclosure.

As depicted in FIG. 2, the quantizing and determining compression due to the quantization may comprise identifying (205), for the cursor value for the layer, an upper bound integer value and a lower bound integer value, in which the upper bound integer value and a lower bound integer value are two nearest integer values that bound the cursor value and represent memory bit sizes for representing parameter values for the layer. Then, the parameter values for that layer may be quantized (210) into an upper bound parameter value set in which a parameter value has a maximum bit size of the upper bound integer value and into a lower bound parameter value set in which a parameter value has a maximum bit size of the lower bound integer value. Although embodiments tested herein used the quantization method as described above with respect to Eq. (4), in one or more embodiments, any of a number of known quantization methodologies may be employed. The above steps are performed for each layer with a cursor value, and a compression component may be computed (215) for a loss function given the quantized parameter values. In one or more embodiments, not every layer is quantized. For example, in one or more embodiments, the first layer of the neural network, the last layer of the neural network, or both may not be quantized (and therefore, may not have corresponding cursor values). As noted above, in one or more embodiments, the size of the quantized parameter values may be computed as a sum for each layer, in which a layer's parameter size may be a blend (such as a weighted blend) of the parameter size of the layer from the upper bound parameter value set and the lower bound parameter value set.

Returning to FIG. 1, responsive to a stop condition having been reached, the final cursor values for the neural network may be output (150) and a final set of parameter values for the neural network may also be output. In one or more embodiments, for each cursor value from a final iteration that is not an integer value, it may be rounded (e.g., rounded down, rounded up, or typical rounding) to an integer value. In one or more embodiments, the rounded cursor values may be used to quantize the parameter values to obtain a final set of parameter values for the neural network.

Finally, in one or more embodiments, a finetuning operation may be performed to adjust at least some of the final set of parameter values. For example, a subsequent training may be performed to finetune the parameter values.

D. Experiments

In this section, results are shown that validate embodiments' performance. First presented are training loss comparisons using one integer quantization and two integers' quantization mentioned in the above section, followed by the search process itself and regularization coefficient analysis. Comparison experimental results on some benchmark datasets are presented at the end of this section.

It shall be noted that these experiments and results are provided by way of illustration and were performed under specific conditions using a specific embodiment or embodiments; accordingly, neither these experiments nor their results shall be used to limit the scope of the disclosure of the current patent document.

The codes were implemented with PyTorch, and Nvidia TiTanX was used to perform all the tests. Since it has been mentioned that with 16 bits, the neural network's performance almost has no loss, tests herein concentrated on possible application of multiple lower bits, that is, 1, 2, 3, 4, 5, 6, 7, 8 bit(s) were applied as the possible quantization bit width for each layer to test the embodiment's feasibility. In the tests, quantization was applied to the weights and full-precision activations were used. Although it shall be noted that, in embodiments, the methodologies herein may be extended to the activations. In addition, the traditions in the domain of DNN quantization were followed to avoid the quantization of the first and last layer in a model.

In all the experiments, implementations of ResNet20 or MobileNetV2 were used as a backbone model. It should be noted that both models preferable should be pre-trained to obtain the floating-point models first. For the initialization of the cursor for each layer, all of them are set with 4 bits for the convenience of iteration. When the cursors are obtained by a tested method embodiment, the model may be further trained from scratch to get its final accuracy, which is a practical tradition in the fields of NAS and quantization.

As for the parameter $\lambda$ in Eq. (2) and the parameter y in the loss of quantization in Eq. (3), a rather optimal set of them was chosen as (0.25, 0.3) after trials. Also studied was the influence of $\lambda$ in the experiments to show that in most cases, the cursor-based adaptive quantization scheme was robust to its change if $\lambda$ is at a larger interval of $\lambda>=0.1$. Concerning the learning rate schedule of weight and cursor, a cosine annealing method was applied to adjust them. The minimum learning rate for them was 0.001 and 0.0001, respectively.

1. Training Loss Comparison

To show the validity of quantization approach using two integer bounds nearest to the cursor, the search process was first implemented by comparing it to using only one nearest integer of the cursor. Their losses were analyzed to show the great distinction in the training process.

Figure 3:
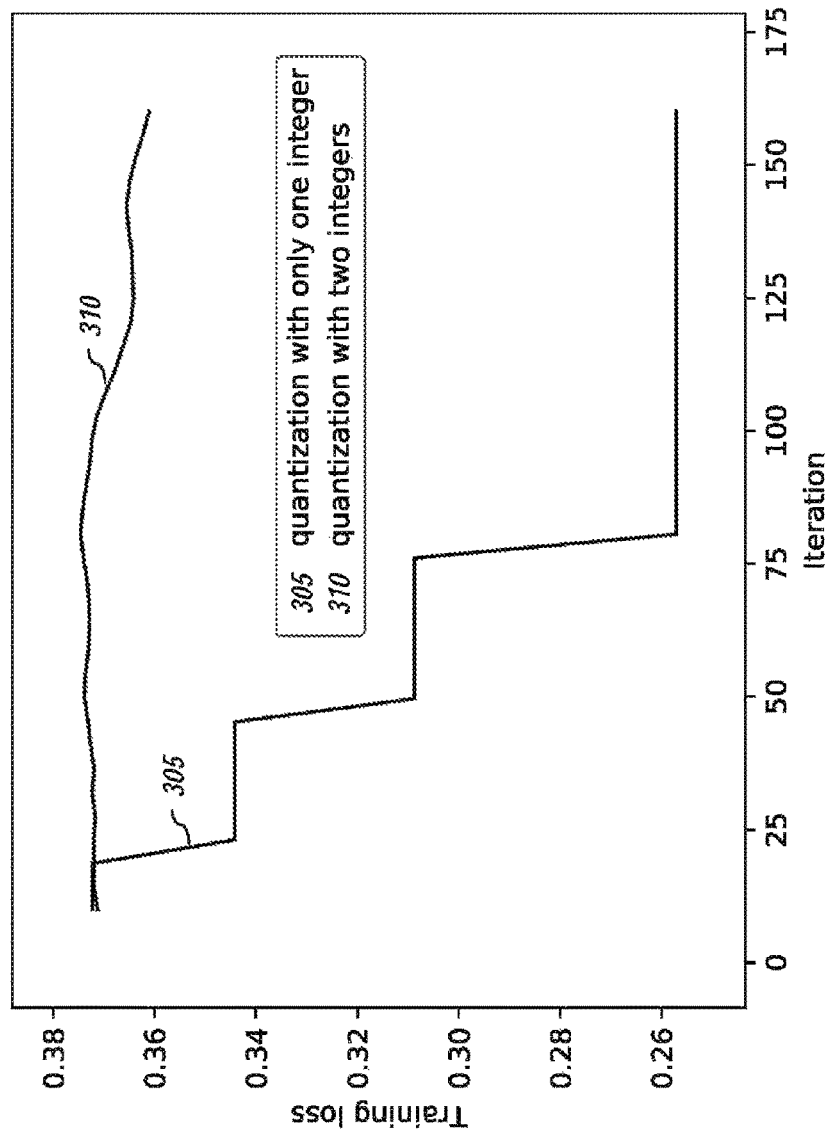
FIG. 3 depicts the loss change for different quantization scheme, according to embodiments of the present disclosure.

Here the ResNet20 implementation was applied on the CIFAR-10 dataset to demonstrate the optimization process. For illustrative purpose, the loss change in part of the iteration process in one epoch was drawn. As shown in FIG. 3, the bottom curve 305 represents the training loss using the one nearest integer to implement quantization, while the top line 310 denotes the loss obtained by using two neighbor integers nearest to the cursor searched by the proposed methodology embodiment. The major differences in these two tests lie at the quantization choices. In fact, some other parameters and random initialization for one integer quantization scheme were also tried, and similar curves were found. Obviously, the top line 310 looks smoother and more natural for a convergence process. The bottom curve loss 305 may lead to a strong possibility that the cursors are stuck in a local minimum region instead. In fact, the cursor values obtained by the one neighbor scheme tend to be 1 bit for all layers after some epochs' iteration. The reason why the one integer quantization scheme fails may be because, in most cases, the weights in one layer span a rather small range, one lower integer quantization may lead to the same quantization results on the weights in the training process. Such same quantization results further yield almost no change in the backward gradient process, which is not beneficial for the optimal cursor search. The designed two integers' quantization process, on the other hand, can map the cursor to two different integer values, leading to efficient change in the loss even for the weights in rather a small value range.

2. Search Process Analysis

Figure 4:
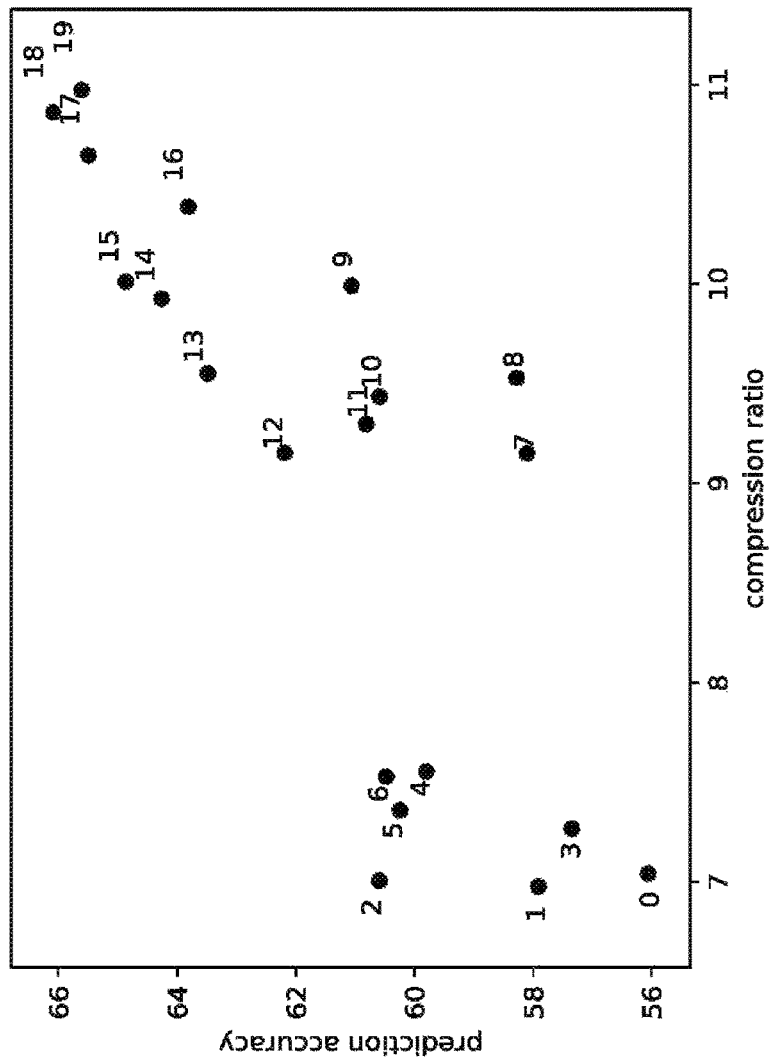
FIG. 4 depicts results of an adaptive cursor search process for a ResNet20 implementation on CIFAR100 data, according to embodiments of the present disclosure.
Figure 5:
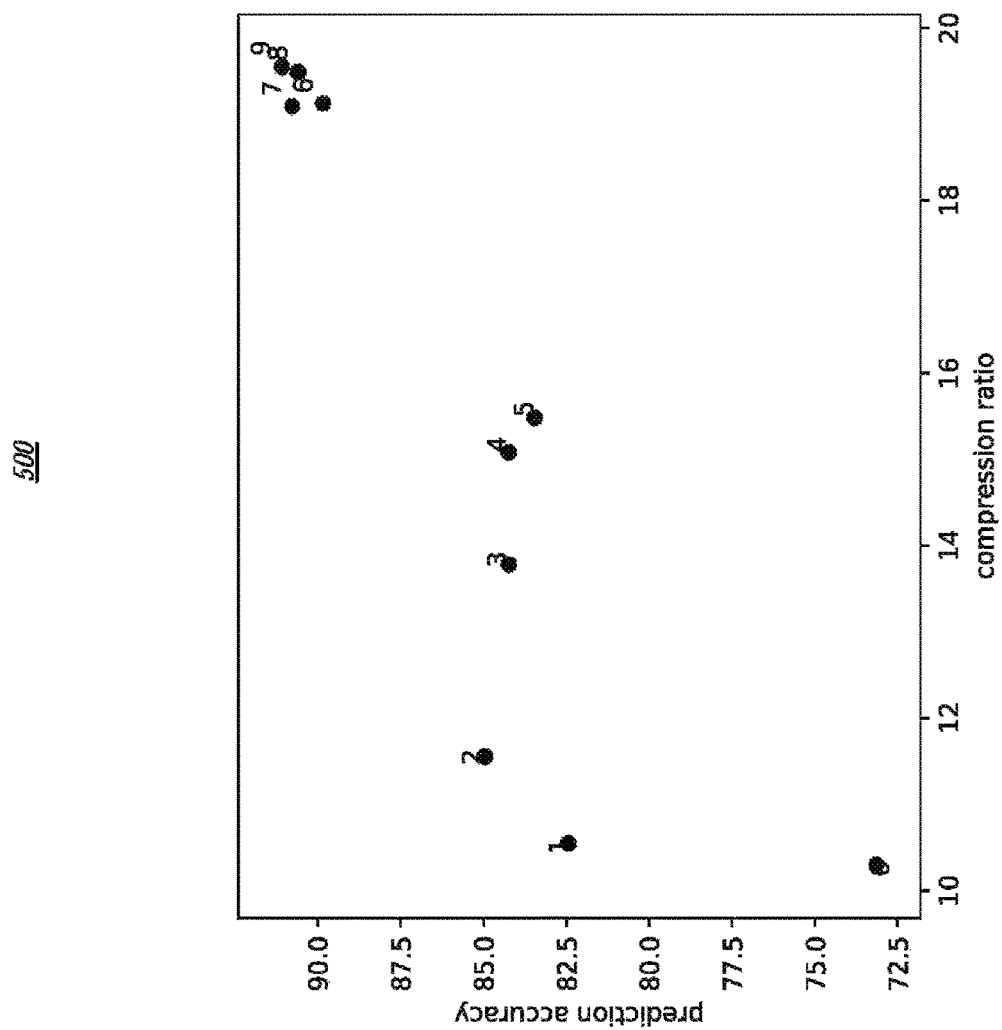
FIG. 5 depicts results of an adaptive cursor search process for a MobileNetV2 implementation on CIFAR10 data, according to embodiments of the present disclosure.

To get some insights of the tested adaptive cursor search algorithm embodiment, its iteration process was investigated in this subsection. For illustration, a ResNet20 implementation was tested using the CIFAR100 dataset and a MobileNetV2 implementation was tested using the CIFAR10 dataset as two examples. Their respective search processes are depicted in FIG. 4 and FIG. 5 with the quantization bits ignored due to space limitation. FIG. 4 depicts results of an adaptive cursor search process for a ResNet20 implementation on CIFAR100 data, according to embodiments of the present disclosure. FIG. 5 depicts results of an adaptive cursor search process for a MobileNetV2 implementation on CIFAR10 data, according to embodiments of the present disclosure. For both figures, the number beside the points represents the epoch.

Here the abscissa and vertical coordinates respectively represent the compression ratio and prediction accuracy. It should be noted that the test algorithm embodiment was run with 20 epochs and 10 epochs, respectively to clearly show the variation of performance. From FIG. 4, it can be seen that for the adaptive cursor search scheme embodiment, it first begins at the lower left region (lower accuracy and compression) and then gradually assembles to the upper right region (higher accuracy and compression). Meanwhile, there are some small vibrations in the tested process, for example, from epoch 8 to epoch 9, there is some increase in accuracy as well as compression ratio, but from epoch 9 to epoch 10, there is a slight reduction in both measures.

The search process for the MobileNetV2 implementation on CIFAR10 dataset is presented in FIG. 5. It can also be noticed that the search process is rather stable and gathers to the final upper right region with better accuracy and compression ratio. One of the reasons why the tested methodology reaches to a region with high prediction accuracy and compression ratio at the same time may be due to the alternative optimization approach to solve this bi-level problem with two goals. In addition, the regularization item may also play a positive role in this process.

3. Impact of Regularization Coefficient $\lambda$

In one or more embodiments, the coefficient $\lambda$ in Eq. (2) controls the balance between the model precision and size. In this part, some experiments were performed to analyze the influence of it on the whole performance. The values of $\lambda=0.9, 0.7, 0.5, 0.25, 0.1, 0.05, 0.01$ were chosen, and their effects on the quantized model were tested. For the purpose of illustration, a ResNet20 implementation was tested on CIFAR10 data. To directly show the effects of the tested cursor-based differentiable search embodiment, a finetune step was not implemented for all these results after finishing the cursor search. The results of the quantized ResNet20 implementation on the CIFAR10 data are demonstrated in Table 1, where CR represents the compression ratio, and all the results are obtained by implementing the search with 200 epochs.

TABLE 1

Performance of the ResNet20 implementation on CIFAR10 data with different $\lambda$ values

| | $\lambda$ | | | | | | |
|---|---|---|---|---|---|---|---|
| | 0.9 | 0.7 | 0.5 | 0.25 | 0.1 | 0.05 | 0.01 |
| accuracy | 90.10 | 90.14 | 90.18 | 91.79 | 91.03 | 91.16 | 91.58 |
| CR | 30.37 | 30.00 | 30.09 | 28.33 | 28.43 | 19.46 | 13.95 |

From Table 1, it can be observed that for λ>=0.1, the whole performance of the quantization method embodiment is rather steady; that is, the accuracy and compression ratio of the quantized model maintain at a concentrated region with the accuracy about 90% while the compression ratio about 29.00. When λ<0.1, the cursor-based adaptive quantization embodiment may still have a good performance of prediction but may gradually loses its effects on model compression. This may be explained that when the regularization becomes gradually weak, it does not exert its compression effects very well as when the coefficient is large. This further validates the effectiveness of the regularization function proposed in this patent document.

4. CIFAR10 Results

A cursor-based adaptive quantization embodiment was demonstrated on CIFAR10 benchmark dataset with a ResNet20 implementation and a MobileNetV2 implementation.

The obtained mixed bits in ResNet20 for each layer are shown in Table 2. It is interesting to note that most of the bits in the final quantization scheme are 1, contributing much to the impressive compression ratio (25.6). This also shows that there is a lot of redundancy among the neural network layers. In addition, the compressed model achieves a prediction accuracy of 92.18% on the test set, which is better than the original full precision model (92.06%) based on our own implementation. It should be pointed out that not much time was spent finetuning the original model to obtain the best performance in the literature. A focus was on the quantization schemes proposed herein, and a target of the tests was to validate that these cursor-based adaptive quantization schemes can efficiently reduce the model size with comparable or better prediction accuracy.

TABLE 2

Bit width for each layer of a ResNet20 implementation on CIFAR10 data obtained using an embodiment of the cursor-based adaptive quantization methodology disclosed in this patent document.

| | Layer | | | | | | | | |
|---|---|---|---|---|---|---|---|---|---|
| | 2 | 3 | 4 | 5 | 6 | 7 | 8 | 9 | 10 |
| Bit | 1 | 1 | 1 | 1 | 1 | 1 | 1 | 4 | 5 |

| | Layer | | | | | | | | |
|---|---|---|---|---|---|---|---|---|---|
| | 11 | 12 | 13 | 14 | 15 | 16 | 17 | 18 | 19 |
| Bit | 1 | 1 | 1 | 1 | 1 | 8 | 1 | 1 | 1 |

The accuracy and compression ratio of the tested cursor-based adaptive quantization methodology embodiment were compared to some related or similar works such as DNAS (B. Wu et al., "Mixed Precision Quantization of Convnets via Differentiable Neural Architecture Search," available at arXiv:1812.00090 (2018)), TTQ (Zhu et al., Trained Ternary Quantization," available at arXiv:1612.01064 (2016)), PACT (Choi et al., "PACT: Parameterized Clipping Activation for Quantized Neural Networks," available at arXiv: 1805.06085 (2018)), and LQE (Zhang et al., "Discrimination-Aware Channel Pruning for Deep Neural Networks," available at arXiv:1810.11809 (2019)) with the Resnet20 implementation on CIFAR-10 data, and the details of accuracy and compression ratio are shown in Table 3.

TABLE 3

Performance comparison with other works

| | Accuracy (%) | CR |
|---|---|---|
| Implementation using Cursor-based Adaptive Quantization | 92.18 | 25.6 |
| DNAS (most efficient) | 92.00 | 16.6 |
| DNAS (most accurate) | 92.72 | 11.6 |
| LQE (2 bit) | 91.80 | 16.0 |
| TTQ (2 bit) | 91.13 | 16.0 |
| PACT (2 bit) | 89.70 | 16.0 |

It can be noticed that, compared to the other related works, the test method embodiment achieved much better compression ratio while achieving comparable or better classification accuracy on the CIFAR10 data. The reason why the embodiment is better than the other quantization methods, such as LQE, TTQ and PACT, may be due to the adaptive cursor-based search mechanism. By considering both the model accuracy and compression ratio, the cursor-based approach embodiment can effectively search different quantization bit for each layer as a whole, leading to better compression ratio with better accuracy. Compared to DNAS, a reason for the better performance of the tested embodiment in terms of CR is partially due to that the two closest integers' quantization scheme produces less quantization error in each layer. In addition, it may be also because of the multiple lower bits' design in the search process.

A cursor-based adaptive quantization embodiment was also applied to a MobilenetV2 implementation, which is a state-of-the-art deep learning model for mobile devices and embedded systems. To save space, the searched bit results for different layers are shown using a tuple as below: [6, 6, 2, 1, 4, 5, 4, 6, 3, 5, 4, 6, 5, 3, 7, 7, 5, 6, 5, 7, 4, 6, 4, 6, 5, 3, 6, 5, 3, 6, 5, 6, 5, 5, 2, 2, 4, 3, 3, 6, 5, 2, 5, 2, 4, 2, 1, 4, 4, 1, 2, 2]. For the MobileNetV2 implementation on CIFAR10 data, the bit distribution was more diversified compared to that of the ResNet20 implementation, this may be attributed to the inherent structure difference of them. The accuracy and compression ratio of the cursor-based adaptive search for the MobilenetV2 implementation is illustrated in Table 4, it can be seen that the tested embodiment yielded a better classification accuracy compared to the original full precision model, together with an impressive compression ratio of 12.42.

TABLE 4

Performance of a MobileNetV2 implementation on CIFAR10 data

| | Accuracy (%) | CR |
|---|---|---|
| Implementation using Cursor-based Adaptive Quantization | 93.28 | 12.42 |
| Original | 92.39 | 1.0 |

5. CIFAR100 Results

To further show the effectiveness of the cursor-based adaptive quantization methodology, a method embodiment was tested on the CIFAR100 dataset using a ResNet20 implementation and a MobileNetV2 implementation. The searched bit for the ResNet20 implementation on the CIFAR100 dataset is demonstrated in Table 5.

TABLE 5

Bit width for each layer obtained by a cursor-based adaptive quantization embodiment on a ResNet20 implementation on CIFAR100 data

| | Layer | | | | | | | | |
|---|---|---|---|---|---|---|---|---|---|
| | 2 | 3 | 4 | 5 | 6 | 7 | 8 | 9 | 10 |
| Bit | 4 | 2 | 4 | 1 | 1 | 2 | 4 | 6 | 2 |
| | Layer | | | | | | | | |
| | 11 | 12 | 13 | 14 | 15 | 16 | 17 | 18 | 19 |
| Bit | 1 | 2 | 2 | 4 | 1 | 2 | 3 | 2 | 5 |

It is illustrated that its performance compared to the original one on the CIFAR100 data in Table 6, it should be pointed out that the original model was not finetuned, so its accuracy may not be the best one in the literature. For the ResNet20 implementation, the tested embodiment achieved a good compression ratio of 11.60 while maintaining comparable accuracy.

TABLE 6

Performance of a ResNet 20 implementation on CIFAR100 data

| | Accuracy (%) | CR |
|---|---|---|
| Implementation using Cursor-based Adaptive Quantization | 68.18 | 11.60 |
| Original | 68.30 | 1.0 |

A MobileNetV2 implementation applied using CIFAR100 data, and the performance of the quantized network is presented in Table 7. It should be noticed that the compressed model with an encouraging compression ratio of 12.86 shows better classification accuracy over the original 32-bit model.

TABLE 7

Performance of a MobileNetV2 implementation on CIFAR100 data

| | Accuracy (%) | CR |
|---|---|---|
| Implementation using Cursor-based Adaptive Quantization | 68.04 | 12.86 |
| Original | 67.96 | 1.0 |

The searched multiple low bit quantization scheme for each layer is: [4, 7, 8, 3, 8, 6, 7, 2, 5, 5, 4, 4, 1, 4, 4, 5, 6, 3, 7, 6, 5, 1, 1, 7, 6, 5, 3, 1, 6, 7, 6, 8, 5, 1, 2, 6, 3, 1, 1, 3, 6, 8, 1, 3, 6, 5, 1, 6, 7, 1, 3, 1]. For the MobileNetV2 implementation, in the final quantization scheme, its bit distribution seems diversified, matching its previous results on the CIFAR10 data.

E. Some Conclusions

In this patent document, embodiments of a novel cursor-based differentiable architecture search methodology are presented for obtaining the optimal mixed precision DNN model. Different from most of the traditional approaches, which choose quantization configuration using heuristics or learning-based rules, in one or more embodiments, the quantization bit is adaptively found for each layer in the DNN model from the perspective of NAS. In one or more embodiments, a cursor-based search algorithm with an alternative manner is applied for efficient optimization. In one or more embodiments, the nearest two neighbor integers to the cursor are used to implement the quantization in the training process to reduce the quantization noise and avoid local convergence. A result of the methodology is the optimal bit width choice for different layers as a whole. Extensive experiments with some typical models demonstrate that the embodiments that were tested provide dramatic compression capability with accuracy on par with or better than the state-of-the-art methods on benchmark datasets. It shall be noted that embodiments of the proposed approaches, or adaptions thereof, may be also applied to activation layers to further improve the compression ability of it.

F. Computing System Embodiments

In one or more embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 6:
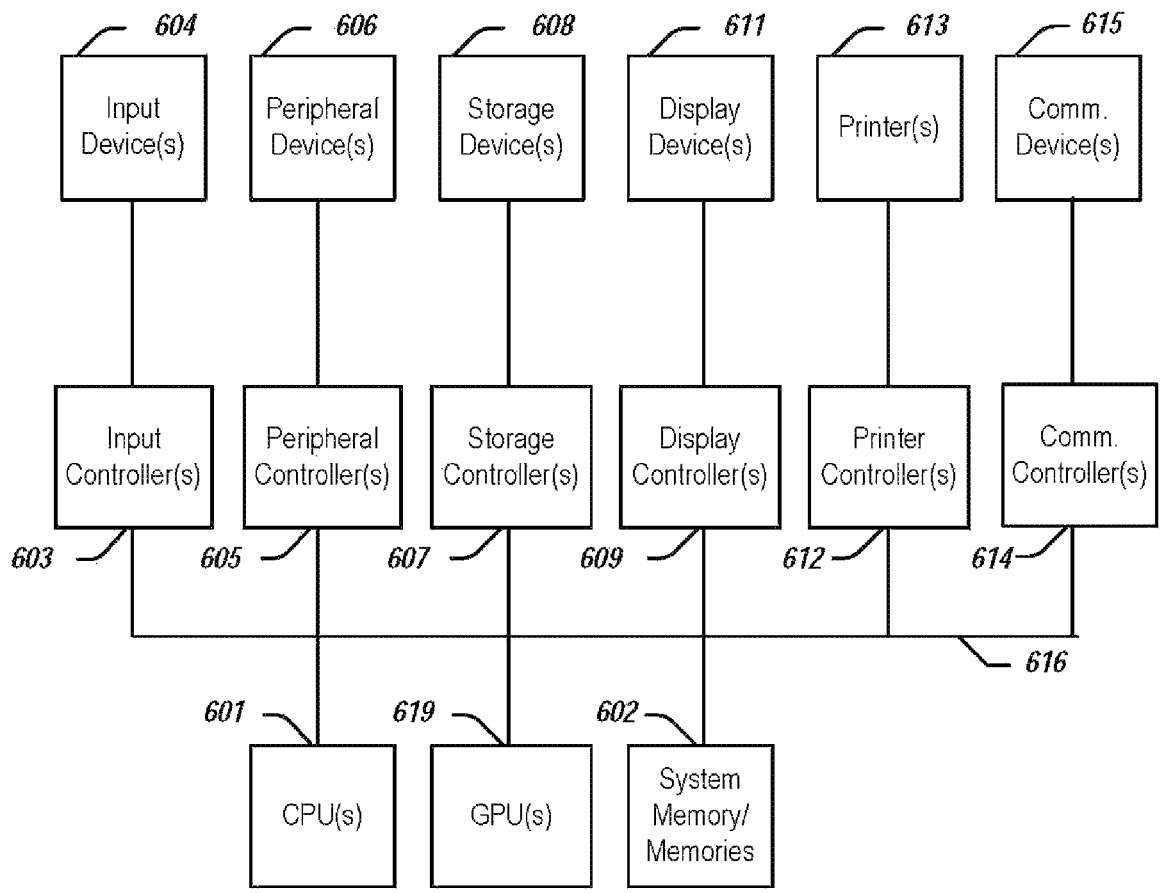
FIG. 6 depicts a simplified block diagram of a computing device/information handling system, in accordance with embodiments of the present disclosure.

FIG. 6 depicts a simplified block diagram of a computing device/information handling system (or computing system) according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provides computing resources and controls the computer. CPU 601 may be implemented with a microprocessor or the like, and may also include one or more graphics processing units (GPU) 619 and/or a floating-point coprocessor for mathematical computations. System 600 may also include a system memory 602, which may be in the form of random-access memory (RAM), read-only memory (ROM), or both.

A number of controllers and peripheral devices may also be provided, as shown in FIG. 6. An input controller 603 represents an interface to various input device(s) 604, such as a keyboard, mouse, touchscreen, and/or stylus. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present disclosure. Storage device(s) 608 may also be used to store processed data or data to be processed in accordance with the disclosure. The system 600 may also include a display controller 609 for providing an interface to a display device 611, which may be a cathode ray tube (CRT), a thin film transistor (TFT) display, organic light-emitting diode, electroluminescent panel, plasma panel, or other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media may include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implement method for reducing memory size of a neural network, which comprises a plurality of layers, the method comprising:
   responsive to a stop condition not being reached, performing steps comprising:
      inputting a training data batch, which was obtained from a training data set comprising input data and corresponding ground truth data, into the neural network to obtain a training data output;
      determining a training data loss for the neural network given the training data output from the neural network and a loss function that comprises a loss component related to prediction accuracy of the neural network and a compression component, which comprises a regularization factor, related to memory size of parameter values of the neural network after quantization;
      updating at least some of the parameter values of the neural network using the training data loss;
      inputting a validation data batch, which was obtained from a validation data set comprising input data and corresponding ground truth data, into the neural network to obtain a validation data output;

determining a validation data loss for the neural network given the validation data output from the neural network and the loss function;

updating cursor values for at least some of the layers of the neural network using the validation data loss, in which a cursor value for a layer in the neural network is related to memory size for representing a set of parameter values for the layer wherein the regularization factor controls a tradeoff between accuracy of the neural network and compression of the set of parameter values; and for each layer of at least some of the layers, quantizing parameter values of the layer of the neural network using two integers that bound the cursor value for that layer, which quantized parameter values are used in determining the compression component of the loss function; and responsive to a stop condition being reached:

outputting final cursor values for the at least some of the layers of the neural network, in which the final cursor value for a layer of the neural network is a bit size for representing parameter values for that layer of the neural network; and providing the set of parameter values for the neural network.

2. The computer-implement method of claim 1 wherein the step of quantizing parameter values for a layer of the neural network comprises:

identifying, for the cursor value for the layer, an upper bound integer value and a lower bound integer value, in which the upper bound integer value and the lower bound integer value are two nearest integer values that bound the cursor value and represent memory bit sizes for representing parameter values for the layer;

quantizing the parameter values for that layer into an upper bound parameter value set in which a parameter value has a maximum bit size of the upper bound integer value; and quantizing the parameter values for that layer into a lower bound parameter value set in which a parameter value has a maximum bit size of the lower bound integer value.

3. The computer-implement method of claim 1 wherein the steps of outputting final cursor values and outputting the set of parameter values for the neural network comprises:

for each cursor value from a final iteration that is not an integer value, rounding the cursor value to an integer value; and using the final cursor values to quantize the parameter values from the final iteration to obtain the set of parameter values for the neural network.

4. The computer-implement method of claim 3 further comprising:

performing a finetuning operation to adjust at least some of the set of parameter values.

5. The computer-implement method of claim 2 wherein the compression component comprises:

a ratio of total memory size for the neural network given quantization of the parameter values relative to memory size for the neural network before quantization.

6. The computer-implement method of claim 5 wherein the ratio is altered by a parameter that affects importance of the ratio in the loss function.

7. The computer-implement method of claim 5 wherein the total memory size for the neural network given quantization of the parameter values represents a blending obtained using the upper bound parameter value set and the lower bound parameter value set.

8. The computer-implement method of claim 1 further comprising:

not quantizing parameter values for a first layer of the neural network;

not quantizing parameter values for a last layer of the neural network; or not quantizing parameter values for the first and the last layers of the neural network.

9. The computer-implement method of claim 1 further comprising:

initializing a cursor value for each of at least some of the layers of the neural network;

initializing the parameter values of the neural network; and initializing a batch size.

10. A system comprising:

one or more processors; and a non-transitory computer-readable medium or media storing one or more sequences of instructions which, when executed by at least one of the one or more processors, causes steps to be performed comprising:

responsive to a stop condition not being reached, performing steps comprising:

inputting a training data batch, which was obtained from a training data set comprising input data and corresponding ground truth data, into a neural network, which comprises a plurality of layers, to obtain a training data output;

determining a training data loss for the neural network given the training data output from the neural network and a loss function that comprises a loss component related to prediction accuracy of the neural network and a compression component, which comprises a regularization factor, related to memory size of parameter values of the neural network after quantization;

updating at least some of the parameter values of the neural network using the training data loss;

inputting a validation data batch, which was obtained from a validation data set comprising input data and corresponding ground truth data, into the neural network to obtain a validation data output;

determining a validation data loss for the neural network given the validation data output from the neural network and the loss function;

updating cursor values for at least some of the layers of the neural network using the validation data loss, in which a cursor value for a layer in the neural network is related to memory size for representing a set of parameter values for the layer wherein the regularization factor controls a tradeoff between accuracy of the neural network and compression of the set of parameter values; and for each layer of at least some of the layers, quantizing parameter values of the layer of the neural network using two integers that bound the cursor value for that layer, which quantized parameter values are used in determining the compression component of the loss function; and responsive to a stop condition being reached:

outputting final cursor values for the at least some of the layers of the neural network, in which the final cursor value for a layer of the neural network is a bit size for representing parameter values for that layer of the neural network; and providing the set of parameter values for the neural network.

11. The system of claim 10 wherein the step of quantizing parameter values for a layer of the neural network comprises:

identifying, for the cursor value for the layer, an upper bound integer value and a lower bound integer value, in which the upper bound integer value and the lower bound integer value are two nearest integer values that bound the cursor value and represent memory bit sizes for representing parameter values for the layer;

quantizing the parameter values for that layer into an upper bound parameter value set in which a parameter value has a maximum bit size of the upper bound integer value; and quantizing the parameter values for that layer into a lower bound parameter value set in which a parameter value has a maximum bit size of the lower bound integer value.

12. The system of claim 10 wherein the steps of outputting final cursor values and outputting the set of parameter values for the neural network comprises:

for each cursor value from a final iteration that is not an integer value, rounding the cursor value to an integer value; and using the final cursor values to quantize the parameter values from the final iteration to obtain the set of parameter values for the neural network.

13. The system of claim 12 wherein the non-transitory computer-readable medium or media further comprises one or more sequences of instructions which, when executed by at least one of the one or more processors, causes steps to be performed comprising:

performing a finetuning operation to adjust at least some of the set of parameter values.

14. The system of claim 11 wherein the compression component comprises:

a ratio of total memory size for the neural network given quantization of the parameter values relative to memory size for the neural network before quantization.

15. The system of claim 14 wherein the total memory size for the neural network given quantization of the parameter values represents a blending obtained using the upper bound parameter value set and the lower bound parameter value set.

16. A non-transitory computer-readable medium or media storing one or more sequences of instructions which, when executed by one or more processors, causes steps to be performed comprising:

responsive to a stop condition not being reached, performing steps comprising:

inputting a training data batch, which was obtained from a training data set comprising input data and corresponding ground truth data, into a neural network, which comprises a plurality of layers, to obtain a training data output;

determining a training data loss for the neural network given the training data output from the neural network and a loss function that comprises a loss component related to prediction accuracy of the neural network and a compression component, which comprises a regularization factor, related to memory size of parameter values of the neural network after quantization;

updating at least some of the parameter values of the neural network using the training data loss;

inputting a validation data batch, which was obtained from a validation data set comprising input data and corresponding ground truth data, into the neural network to obtain a validation data output;

determining a validation data loss for the neural network given the validation data output from the neural network and the loss function;

updating cursor values for at least some of the layers of the neural network using the validation data loss, in which a cursor value for a layer in the neural network is related to memory size for representing a set of parameter values for the layer wherein the regularization factor controls a tradeoff between accuracy of the neural network and compression of the set of parameter values; and for each layer of at least some of the layers, quantizing parameter values of the layer of the neural network using two integers that bound the cursor value for that layer, which quantized parameter values are used in determining the compression component of the loss function; and responsive to a stop condition being reached:

outputting final cursor values for the at least some of the layers of the neural network, in which the final cursor value for a layer of the neural network is a bit size for representing parameter values for that layer of the neural network; and providing the set of parameter values for the neural network.

17. The non-transitory computer-readable medium or media of claim 16 wherein the step of quantizing parameter values for a layer of the neural network comprises:

identifying, for the cursor value for the layer, an upper bound integer value and a lower bound integer value, in which the upper bound integer value and the lower bound integer value are two nearest integer values that bound the cursor value and represent memory bit sizes for representing parameter values for the layer;

quantizing the parameter values for that layer into an upper bound parameter value set in which a parameter value has a maximum bit size of the upper bound integer value; and quantizing the parameter values for that layer into a lower bound parameter value set in which a parameter value has a maximum bit size of the lower bound integer value.

18. The non-transitory computer-readable medium or media of claim 16 wherein the steps of outputting final cursor values and outputting the set of parameter values for the neural network comprises:

for each cursor value from a final iteration that is not an integer value, rounding the cursor value to an integer value; and using the final cursor values to quantize the parameter values from the final iteration to obtain the set of parameter values for the neural network.

19. The non-transitory computer-readable medium or media of claim 16 wherein the compression component comprises:

a ratio of total memory size for the neural network given quantization of the parameter values relative to memory size for the neural network before quantization.

20. The non-transitory computer-readable medium or media of claim 19 wherein the total memory size for the neural network given quantization of the parameter values represents a blending obtained using an upper bound parameter value set and a lower bound parameter value set.

* * * * *